United States Patent
Maunz et al.

(10) Patent No.: US 11,056,332 B1
(45) Date of Patent: Jul. 6, 2021

(54) MICROFABRICATED ION TRAP CHIP WITH IN SITU RADIO-FREQUENCY SENSING

(71) Applicant: National Technology & Engineering Solutions of Sandia, LLC, Albuquerque, NM (US)

(72) Inventors: Peter Lukas Wilhelm Maunz, Albuquerque, NM (US); Matthew G. Blain, Albuquerque, NM (US); Christopher Nordquist, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/821,150

(22) Filed: Mar. 17, 2020

Related U.S. Application Data (60) Provisional application No. 62/820,692, filed on Mar. 19, 2019.

(51) Int. Cl.
*H01J 49/42* (2006.01)
*G06N 10/00* (2019.01)
*H01J 49/00* (2006.01)
*B82Y 10/00* (2011.01)

(52) U.S. Cl.
CPC ............ *H01J 49/422* (2013.01); *B82Y 10/00* (2013.01); *G06N 10/00* (2019.01); *H01J 49/0018* (2013.01)

(58) Field of Classification Search
None
See application file for complete search history.

(56) References Cited

U.S. PATENT DOCUMENTS

| | | | |
|---|---|---|---|
| 6,893,578 B1 | 5/2005 | Clews et al. | |
| 2008/0048112 A1* | 2/2008 | Makarov | H01J 49/427 250/290 |
| 2011/0019321 A1* | 1/2011 | Chen | G01R 31/64 361/87 |
| 2012/0292505 A1* | 11/2012 | Damiano | H01J 37/20 250/307 |
| 2013/0200260 A1* | 8/2013 | Moulds | H01G 4/228 250/289 |
| 2016/0322188 A1* | 11/2016 | Youngner | G06N 10/00 |

OTHER PUBLICATIONS

Baker, R. J. "CMOS Fabrication by Jeff Jessing", CMOS Circuit Design, Layout and Simulation 3rd Edition, 2008, pp. 161-212, vol. 1.
Biedermann, G. "Sandia ion trap foundry", Sandia National Laboratories, 2010, SAND201000327.
Blain, M. and Stick, D. "Surface Electrode—Triangle—Ion Trap Technology Overview", 2013, SAND 20138542.

(Continued)

*Primary Examiner* — James Choi
(74) *Attorney, Agent, or Firm* — Martin I. Finston (57) ABSTRACT

A radio-frequency (RF) surface ion trap chip includes an RF electrode and an integrated capacitive voltage divider in which an intermediate voltage node is capacitively connected between the RF electrode and a ground. A sensor output trace is connected to the intermediate voltage node.

14 Claims, 10 Drawing Sheets

(56) References Cited

OTHER PUBLICATIONS

Blatt R. and Wineland, D. "Entangled states of trapped atomic ions", Nature, 2008, pp. 108-115, vol. 453.
Chiaverini, J. et al., "Surface Electrode Architecture for Ion-Trap Quantum Information Processing", Quatum Information and Computation, 2005, pp. 419-439, vol. 5.
Depaolis, R. et al., "Low-Loss DC-100 GHz Suspended Microstrip Lines on Micromachined SiGe BiCMOS BEOL Technology", IEEE Microwave and Wireless Components Letters, 2016, pp. 225-227 vol. 26.
Haffner, H. et al., "Quantum computing with trapped ions", UC Berkeley Department of Physics, 2008, http://arxiv.org/abs/0809.4368v1.
Hettak, K. et al., "Design and characterization of elevated CPW and thin film microstrip structures for millimeter-wave applications" IEEE, 2005 European Microwave Conference, Paris.
Highstrete, C. et al., "Technology for On-Chip Qubit Control with Microfabricated Surface Ion Traps", Sandia National Laboratories, 2013, SAND 2013-9513.
Kwon, Y. et al., "Low-Loss Micromachined Inverted Overlay CPW Lines with Wide Impedance Ranges and Inherent Airbridge Connection Capability", IEEE Microwave and Wireless Components Letters, 2001, pp. 59-61, vol. 11.
Lee, H-S. et al., "New Micromachined Microstrip Transmission Lines for Application in Millimeter-Wave Circuits", Microwave and Optical Technology Letters, 2004, pp. 6-9, vol. 40.
Leibfried, D. et al., "Quantum dynamics of single trapped ions", Reviews of Modem Physics, 2003, pp. 281-324, vol. 75.
Maunz, P. et al., "Microfabricated traps for Logical Qubits", Sandia National Laboratories, 2017, SAND 2017-9902C.
Maunz, P. et al., "Microfabricated traps for Logical Qubits", Sandia National Laboratories, 2018, SAND 2018-6697PE.
Milanovic, V. et al., "Micromachined Microwave Transmission Lines in CMOS Technology", IEEE Transactions on Microwave Theory and Techniques, 1997, pp. 630-635, vol. 45.
Moehring, D.L. et al., "Design, Fabrication, and Experimental Demonstration of Junction Surface Ion Traps", Quatum Physics, 2011, arXiv:1105.1834.
Mount, E. et al., "Single qubit manipulation in a microfabricated surface electrode ion trap", Sandia National Laboratories, 2013, SAND2013-4454J.
Nordquist, C. et al., "Poly-Silicon Based Latching RF MEMS Switch", IEEE Microwave and Wireless Components Letters, 2009, pp. 380-382, vol. 19.
Prestage, J.D. et al., "New ion trap for frequency standard applications", Journal of Applied Physics, 1989, pp. 1013-1017, vol. 66.
Reinke J. et al., "4-BIT RF MEMS Phase Shifter Monolithically Integrated with Conventional CMOS", MEMS 2011, Cancun, Mexico, pp. 748-751.
Seidelin, S. et al., "Microfabricated Surface-Electrode Ion Trap for Scalable Quantum Information Processing", Physical Review Letters, 2006, 253003, vol. 96.
Sterner, M. et al., "Electrochemically Assisted Maskless Selective Removal of Metal Layers for Three-Dimensional Micromachined SOI RF MEMS Transmission Lines and Devices", Journal of Microelectromechanical Systems, 2011, pp. 899-908, vol. 2011.
Stick, D. et al., "Demonstration of a microfabricated surface electrode ion trap", Physics Instrumentation and Detectors, 2010, https://arxiv.org/abs/1008.0990.
Tabakov, B., "Loading an Equidistant Ion Chain in a Ring Shaped Surface Trap and Anomalous Heating Studies with a High Optical Access Trap," Dissertation, Doctor of Philosophy Physics, The University of New Mexico, Albuquerque, New Mexico, Jul. 2015, 180 pages.

* cited by examiner

MICROFABRICATED ION TRAP CHIP WITH IN SITU RADIO-FREQUENCY SENSING

CROSS-REFERENCE TO RELATED APPLICATION

This application claims the benefit of U.S. Provisional Application No. 62/820,692, filed on Mar. 19, 2019, the entirety of which is hereby incorporated herein by reference.

ACKNOWLEDGEMENT OF GOVERNMENT SUPPORT

This invention was made with Government support under Contract No. DE-NA0003525 awarded by the United States Department of Energy/National Nuclear Security Administration. The Government has certain rights in the invention.

FIELD OF THE INVENTION

The invention relates to ion traps for quantum information processing.

ART BACKGROUND

It has long been known that isolated atomic ions can be confined in so-called "ion traps" constituted by superposed electrostatic and radio frequency (RF) fields. The technology of ion traps was first developed for applications in mass spectrometry. More recently, however, researchers in the field of quantum information processing have recognized that an ensemble of trapped atomic ions is a promising host system for the operations that underlie quantum computation. Atomic energy levels can be used to encode quantum bits (qubits) in trapped ions and optical, RF, or microwave energy can be used realize quantum gates between these qubits. Coherence times that are ample for quantum computation have been demonstrated. Techniques have been developed for storing and transporting pluralities of trapped ions.

It has been known since the publication of Earnshaw's theorem in 1842 that a charged particle cannot be stably trapped solely with electrostatic fields. Instead, ion traps rely at least in part on the ponderomotive force exerted on ions by an oscillatory (ac) field, typically at radio frequency. The ponderomotive force can be understood intuitively as the time-averaged effect on the position of an ion driven by a spatially inhomogeneous, oscillating electric field. Within each cycle of the oscillating field, the ion will be displaced farther during the half-cycle when the field is stronger at the ion's initial position. The net effect is to urge the ion in the direction of decreasing field strength, irrespective of the polarity of the ionic charge.

Quantitatively, a pseudopotential $\psi(x)$ is defined in terms of the charge q and mass m of the ion and the angular frequency $\Omega$ and electric field strength $E(x)$ of the RF field by:

$$\psi(x) = \frac{q}{4m\Omega^2} E^2(x).$$

The ponderomotive force $F_p(x)$ is proportional to the gradient of the pseudopotential; that is, $$F_p(x) = q \nabla \psi p(x).$$

The trap center is at the null of the ac electric field, which leads to the minimum of the RF pseudopotential. The trapped ions oscillate about this RF null. These oscillations are referred to as secular motion, with secular frequencies $\psi_i$. Under the assumption of small-amplitude harmonic motion about the RF null, and assuming that the magnitude of the electric field varies as 1/r, where r is the distance from the potential minimum, the secular frequencies are approximated by $$\omega_i = \frac{q}{2m\Omega} \sqrt{\partial_i^2 E^2(x)}.$$

It will be understood from the above equation that the secular frequencies are determined by the curvature of the pseudopotential.

In stable traps, the secular frequencies are smaller than the RF frequency). A stability factor $q_s$ is defined by $q_s = 2\sqrt{2}(\omega_i/\Omega)$. Stability of ions in the trap is described by the stability diagram for Mathieu's differential equation. For $q_s < 0.9$ and small control voltages, traps are stable.

Ion traps that rely on an RF null in the pseudopotential are often referred to as Paul traps, in recognition of the pioneering work of Wolfgang Paul in the 1950s. The trap that Paul demonstrated in 1954 used a quadrupole RF field produced by a ring electrode describing a hyperboloid of revolution about a central axis, and two hyperbolic end-cap electrodes situated at opposite positions along the central axis.

Geometrically, the hyperbolic Paul trap is a bulk three-dimensional (3D) trap. The RF null is point-like, which limits the trap occupancy with minimal micro-motion at any given time to a single particle.

The principles mentioned above are discussed more fully in D. Leibfried, R. Blatt, C. Monroe, and D. Wineland. "Quantum Dynamics of Single Trapped Ions." *Reviews of Modern Physics* 75, no. 1 (Mar. 10, 2003): 281-324, https://doi.org/10.1103/RevModPhys.75.281.

A further development is the linear 3D trap, which extends the RF null into a nodal line along a central symmetry axis of the device. Four rod-shaped electrodes, arranged in opposing pairs, are arrayed about the central axis. One pair is grounded, and the other pair is excited with the RF input signal. Axial confinement is provided by static voltages applied to the endcaps.

The linear 3D trap was first introduced in 1989. (See, for example, J. D. Prestage et al., *J. Appl. Phys.* 66.3 (1989), 1013-1017.) In more recent developments, the three-dimensional conformation of the electrodes has been unfolded and mapped to a two-dimensional (2D) surface to produce a surface RF trap. Unlike the bulk traps, the surface traps permit optical access to the trapped ions over a full hemisphere.

An early design for a surface RF trap was described in J. Chiaverini et al., "Surface-Electrode Architecture for Ion-Trap Quantum Information Processing," Quantum Info. and Comp. 5 (2005) 419-439. In that design, there are five coplanar, rectilinear electrodes. The center electrode and the two outer electrodes are maintained at RF ground, and the RF signal is applied to the other two electrodes. The RF null is in a line above and parallel to the center electrode. This line coincides with the z-axis, i.e. the principal axis of the trap in the longitudinal direction. Importantly, the two outer electrodes can be subdivided into segments for independent application of static (dc) potentials that can be varied in the longitudinal direction for purposes of longitudinal confinement and various types of control.

The other two principal axes lie in a plane perpendicular to the z-axis. Because of the mirror symmetry of the five-electrode design, the x- and y-axes are respectively parallel and perpendicular to the electrode plane.

It is noteworthy, however, that the x- and y-axes can be rotated within their plane by changing the relative widths of the respective electrodes in a manner that breaks the mirror symmetry.

Chiaverini et al. predicted that a five-electrode surface RF trap would be able to trap ions at a distance of about 50 µm above the electrode plane. For an input RF signal 100V in amplitude and 100 MHz in frequency, the predicted secular frequencies would be in the range of 10 MHz.

A four-electrode surface RF trap was reported in S. Seidelin et al., "Microfabricated Surface-Electrode Ion Trap for Scalable Quantum Information Processing," *Phys. Rev. Lett.* 96 (2006) 253003-1 to 253003-4. In that design, the two RF electrodes alternated with the two dc control electrodes. One of the control electrodes was subdivided into four independent segments. RF grounds for the control electrodes were provided by 820-pf capacitors.

The z-axis of the Seidelin et al. trap was about 40 µm above the electrode plane. The RF input signal had an amplitude of about 46V to about 103V and a frequency of about 87 MHz. The longitudinal secular frequency was in the range 1.84-2.85 MHz, and the other two measured secular frequencies were in the range 15.78-17.13 MHz for an input RF amplitude of 103.2V, and in the range 5.28-8.29 MHz for an input RF amplitude of 46.1V. The x and y principal axes were inclined at about 45° to the electrode plane.

Subsequent surface RF traps have been made with multiple levels of metallization. Additional levels of metallization are useful for shielding and for routing of voltages and ground connections. For example, D. Stick et al., "Demonstration of a microfabricated surface electrode ion trap," dated Oct. 23, 2018, arXiv:1008.0990v2 [physics.ins-det] (16 Nov. 2010) (four pages), reported a symmetrical four-electrode trap fabricated on an SOI wafer. The electrodes were fabricated in a top metal layer separated by 9-14 µm of insulating oxide from an aluminum ground plane. The dc electrodes were segmented to provide a total of 42 control electrodes. An insulating dielectric separated the ground plane from the top silicon of the wafer. The insulating oxide was formed by deposition into supporting pillars for features of the top metal, including the trap electrodes, their leads, and outside grounded regions.

Exposed dielectrics are liable to collect stray charges that can shift the trapping potentials. To mitigate this problem, trap electrodes and other features of the top metal were made to overhang their supporting oxide pillars by 5 µm. This was intended to reduce line-of-sight exposure of the trapped ions to the dielectric surfaces. The overhang distance was a controllable value achieved by using vertical etch stops around the pillars.

The overhangs had the additional benefit of permitting metal to be vertically deposited over the electrode layer without shorting the electrodes.

Ions were loaded from the backside of the wafer through a hole that extended the entire length of the trapping region.

The trap was operated with RF drive frequencies spanning the range at least from 27 MHz to 43 MHz. The amplitude of the drive signal was in the range 50V-200V. Ions were observed to be trapped 80 µm above the electrode plane. Typical observed secular frequencies were 1 MHz axial and 4 MHz radial. A dc offset applied to the RF electrodes was able to change the radial secular frequencies and to rotate the principal axes. The control electrodes were used to demonstrate repeated shuttling of a trapped ion over half the length of the trapping structure, which encompassed ten electrodes over a distance of 770 µm.

Surface ion traps laid out in two dimensions are necessary for operations in which ion chains are split, recombined, and reordered. Accordingly, junction traps have been designed in which three, or even four, linear traps intersect in a junction region. The junction, however, has been found to cause pseudopotential barriers that may be comparable in height to the trap depth. Loading holes can also cause troublesome pseudopotential barriers. Hence, there has been an effort to find design modifications that reduce the pseudopotential barriers arising from both causes.

A surface ion trap with Y-shaped junctions (a so-called "Y-junction trap") was reported in D. L. Moehring et al., "Design, fabrication and experimental demonstration of junction surface ion traps," *New J. Phys.* 13 (2011) 075018 (eight pages). The design of the individual linear traps was similar to that reported in D. Stick et al., cited above. In total, the Y-junction trap had 47 independent dc electrodes.

The RF drive signal had a frequency of about 43 MHz. The rf amplitude was varied from 25V to 165V for trapping in the loading hole, and from 85V to 120V for junction shuttling. The measured height of the trapped ions above the electrode plane (after shuttling from the loading hole) was about 70 µm.

A known technique for locally changing the magnitude and slope of the equilibrium pseudopotential is to spatially modulate the edges of the electrodes. Moehring et al. applied spatial modulation to the dc and RF electrodes near the junction and the loading hole to reduce the pseudopotential barriers caused by those features while maintaining the trapping node within a specified height range above the electrode plane.

More specifically, device performance was predicted from boundary element method (BEM) calculations of the electrostatic field. The electrode geometry for each calculation was specified by a set of parameters defining the electrode shapes in terms of planar polygons in three spatial dimensions. The design was iterated in order to minimize a cost function over the parameter space. The cost function included contributions from the ion height, the pseudopotential values, and the pseudopotential derivatives along the equilibrium trap axis of one arm of the Y-junction.

Experiments performed on fabricated Y-junction traps verified the repeated shuttling of ions in a round trip of about 30 µm that went up and back through each of the three arms of the junction. High degree-of-freedom (DOF) shuttling routines were successfully performed using 25 dc electrodes at a time for linear shuttling and 35 dc electrodes at a time for junction shuttling. Reduced DOF routines were also successfully performed, using the nearest seven dc electrodes at a time in the linear regions and the central 13 dc electrodes in the junction region.

In more complex shuttling routines, three ions were consecutively loaded and independently shuttled into each arm of the junction. Reordering within linear ion chains was demonstrated by splitting the chains, independently shuttling the ions through the junction, and recombining the chains.

A linear surface ion trap can support a chain of trapped ions that are localized at the nodal line and confined within the same potential well. Because there is strong ion-to-ion coupling of the ionic motion in such a trapped chain, the normal modes of the chain form a useful basis of eigenfunctions for describing the collective motion in such a system. Quantum gates between different ions can be realized through operations that affect the collective motion and the internal states of individual ions.

In addition to linear traps, so-called "point-Paul traps" are also of interest for quantum information processing. In a point-Paul trap, the ions are trapped at a nodal point of a three-dimensional quadrupole field. Although in principle such a trap can simultaneously trap multiple ions, micromotion can be minimized for only a single trapped ion. (It will be recalled that "micromotion" is the deterministic motion of the ion at the frequency of the applied RF field.)

If the spacing among multiple point-Paul traps is close enough, the Coulomb repulsion between electrons occupying neighboring traps causes coupling that can be exploited to realize quantum gates.

Although surface ion traps are demonstrably useful, there are still technological challenges to be overcome before these devices can find broad application in quantum information processing. One of these challenges is the problem of ion heating, which, among other undesirable effects, tends to disturb the ionic motion, destabilize trapped ion chains, and limit the fidelity of quantum gates.

Another challenge is posed by trap heating effects due to RF dissipation, which have impeded efforts to operate traps at very low temperatures.

Efforts are underway to better understand the sources of ionic heating, and to decrease power requirements so that power dissipation in the trapping structures can be reduced.

Another challenge is stabilization of the RF drive amplitude. The secular frequencies of the trapped ions depend on the applied RF amplitude, among other factors, and therefore they will fluctuate with RF amplitude fluctuations. However, for applications in quantum information processing, it is important to maintain well-defined and stable ionic oscillation frequencies. The RF source is generally situated off-chip. The trap is usually part of an RF resonator used for impedance matching and voltage amplification. The voltage on the RF electrodes depends on the incoming RF power but also on temperature dependent properties of the resonator and trap itself. Hence, it is highly desirable to be able to feed back to the RF source a temperature-independent, low-power sensor output signal that is responsive to the actual RF amplitude on the trap chip.

Yet another challenge is to further reduce the pseudopotential barriers and fluctuations due to features of the trap geometry, such as the perturbations that arise due to the absence of a ground plane near loading holes and other openings. This challenge invites new methodologies for optimizing the trap geometry.

Yet another challenge is posed when it is desired to use the magnetic component of microwave radiation, instead of laser light, to excite hyperfine qubit transitions in the trapped ions. Current approaches are inefficient because they rely on the far field of an external microwave antenna. Hence, the challenge is to more efficiently couple microwave input signals to the trapped ions for control of the qubit states without encroaching on die area needed to implement the traps.

SUMMARY OF THE INVENTION

The oscillation frequency of trapped ions in an RF Paul trap depends on the amplitude of the applied RF field. Applications of the trap in quantum information processing require a well-defined and stable oscillation frequency. Hence, it is important to stabilize the RF amplitude.

To address this problem, we have integrated a capacitive voltage divider on the die that contains the RF Paul trap. The capacitive voltage divider includes a sensor plate coupled through a lower-valued capacitance $C_{low}$ to the RF electrode and coupled through a higher-valued capacitance $C_{high}$ to a ground plane. An interlayer dielectric separates the sensor plate from the RF electrode. In embodiments, the voltage output from the sensor plate is routed through a channel shielded by overlying and underlying ground planes.

A capacitively coupled RF sensor can be realized using as few as two metallization layers. However, preferred embodiments use a die with at least three metallization layers. An example embodiment described below uses a die with four or more metallization layers separated by interlayer dielectric. They are: A ground layer, an RF layer above the ground layer, and a lower and an upper intermediate layer situated between the ground and RF layers. The routing channel for the output from the sensor plate is fabricated in the lower intermediate layer. The routing channel is shielded by a grounded portion of the upper intermediate layer and by the ground layer.

In embodiments, $C_{low}$ is approximately 80 fF and $C_{high}$ is approximately 16 pF, so that the capacitive voltage divider has a divider ratio of approximately 200:1. By "approximately" is meant "within 25%".

In embodiments, an aluminum wire is included on the die as a temperature sensor.

Temperature sensing is important, not least, because it provides an indication of how much RF heating of the trap chip is taking place.

By way of example, the aluminum wire may be 2 μm wide, 140 mm long, and conformed in a meandering shape. In examples, the aluminum wire has a room-temperature resistance of 1 kΩ±0.25 kΩ.

The temperature is determined from the electrical resistance of the aluminum wire, which is measured by the four-probe technique. Temperature measurements can be performed by that method over at least the range from 10° K to 500° K.

BRIEF DESCRIPTION OF THE DRAWINGS

FIGS. 6A and 6B provide a cross-sectional view, approximately to scale, of the slotted quantum region of an ion trap fabricated in four metallization layers.

DETAILED DESCRIPTION

Figure 1:
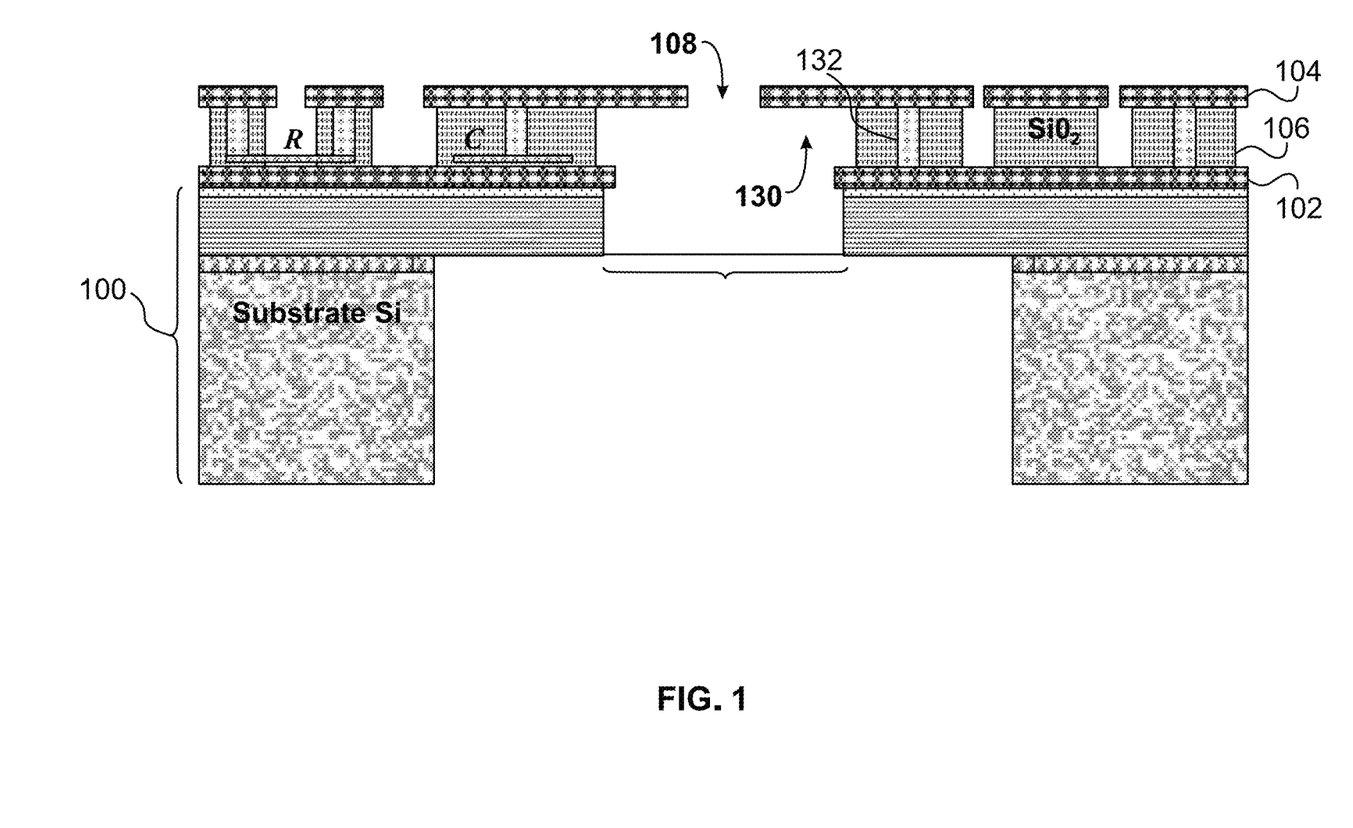
FIG. 1 is a cross-sectional cartoon view of an example ion trap that uses two metallization layers.
Figure 2:
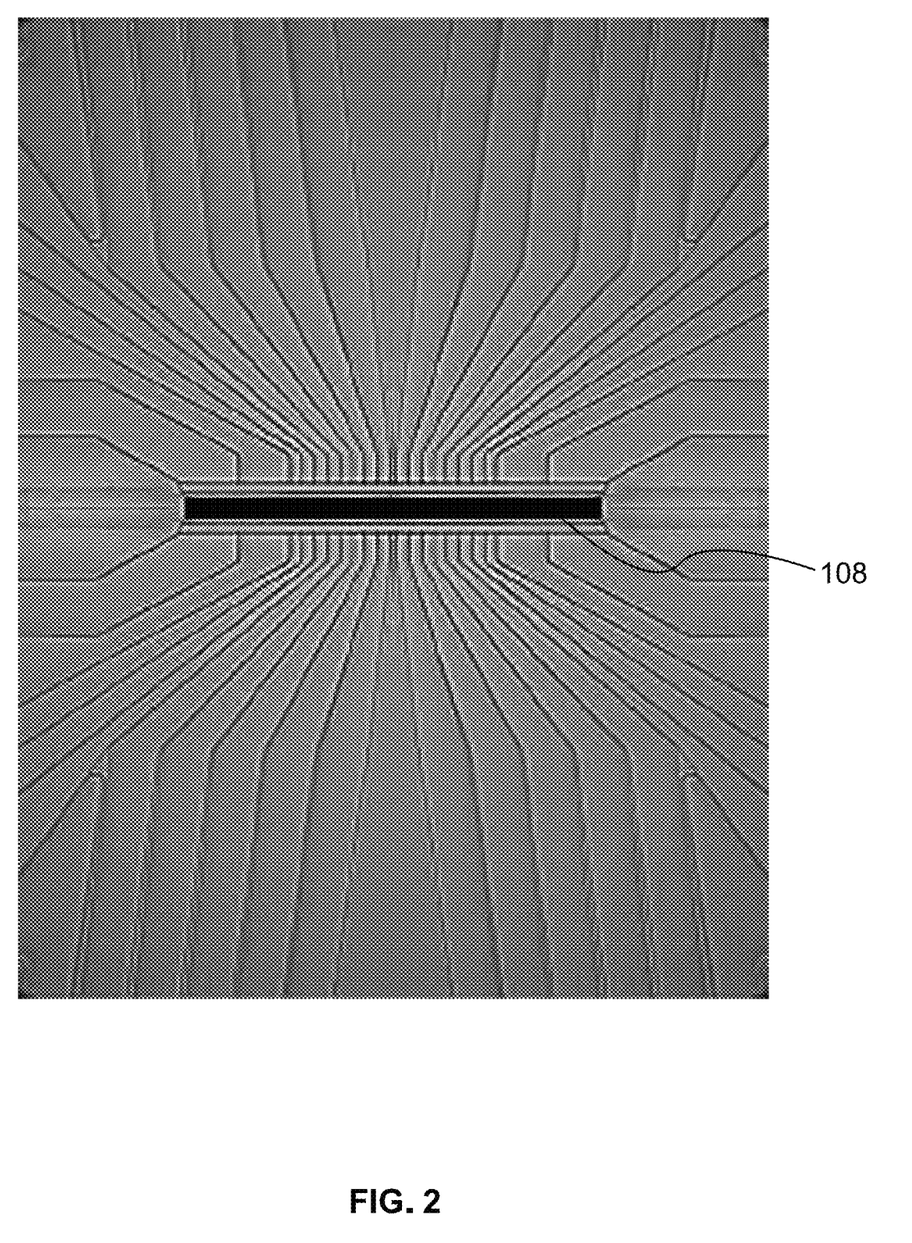
FIG. 2 is an overhead view of the ion trap of FIG. 1.

FIGS. 1 and 2 provide schematic views of an example ion trap of the kind reported in D. Stick et al. (16 Nov. 2010), cited above. The ion trap described here is offered solely for illustrative purposes and is not meant to be limiting.

Figure 3:
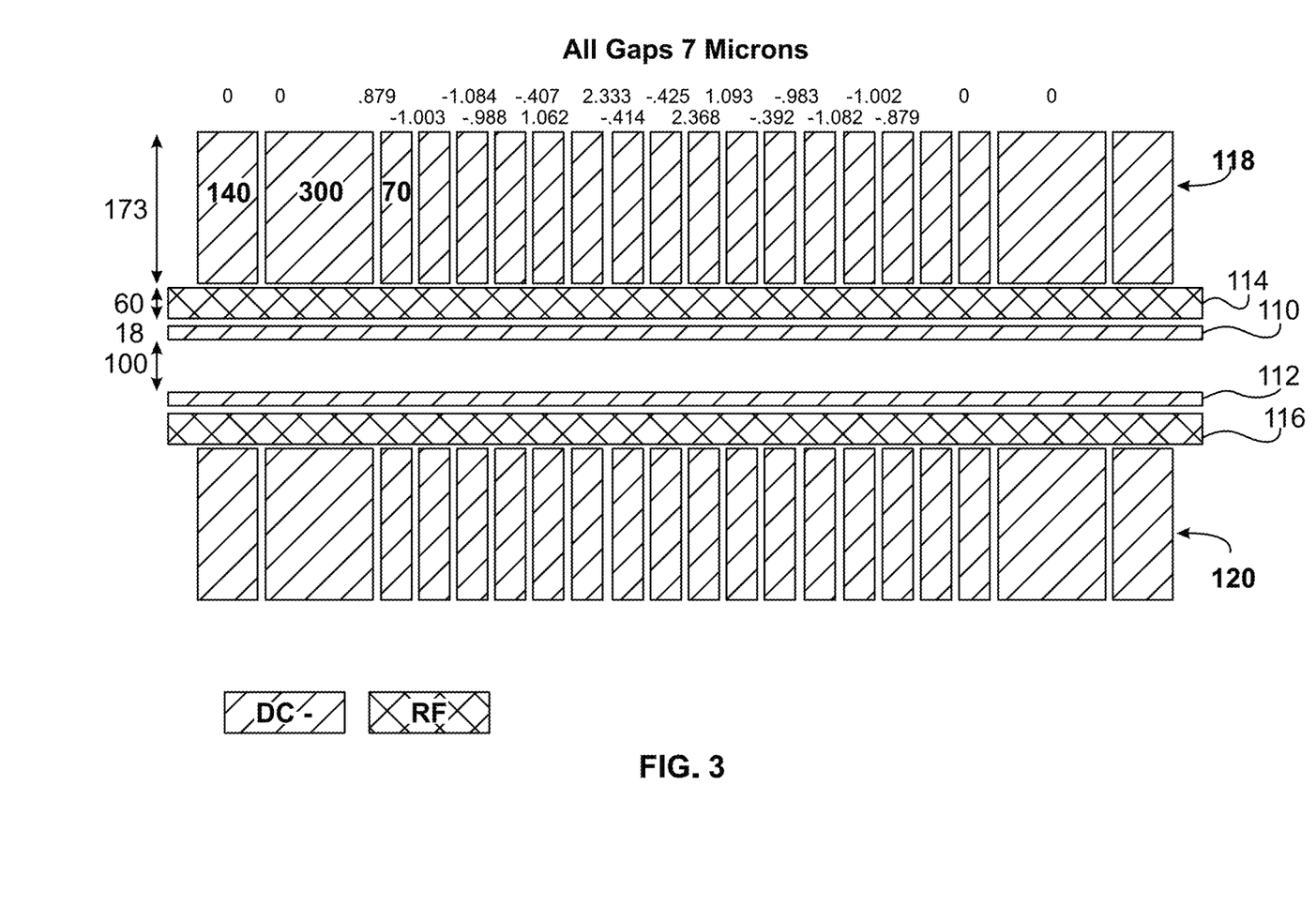
FIG. 3 is an overhead view of a fabricated prototype similar to the ion trap of FIGS. 1 and 2. The loading hole and part of the electrode layout are visible in the figure.
Figure 4:
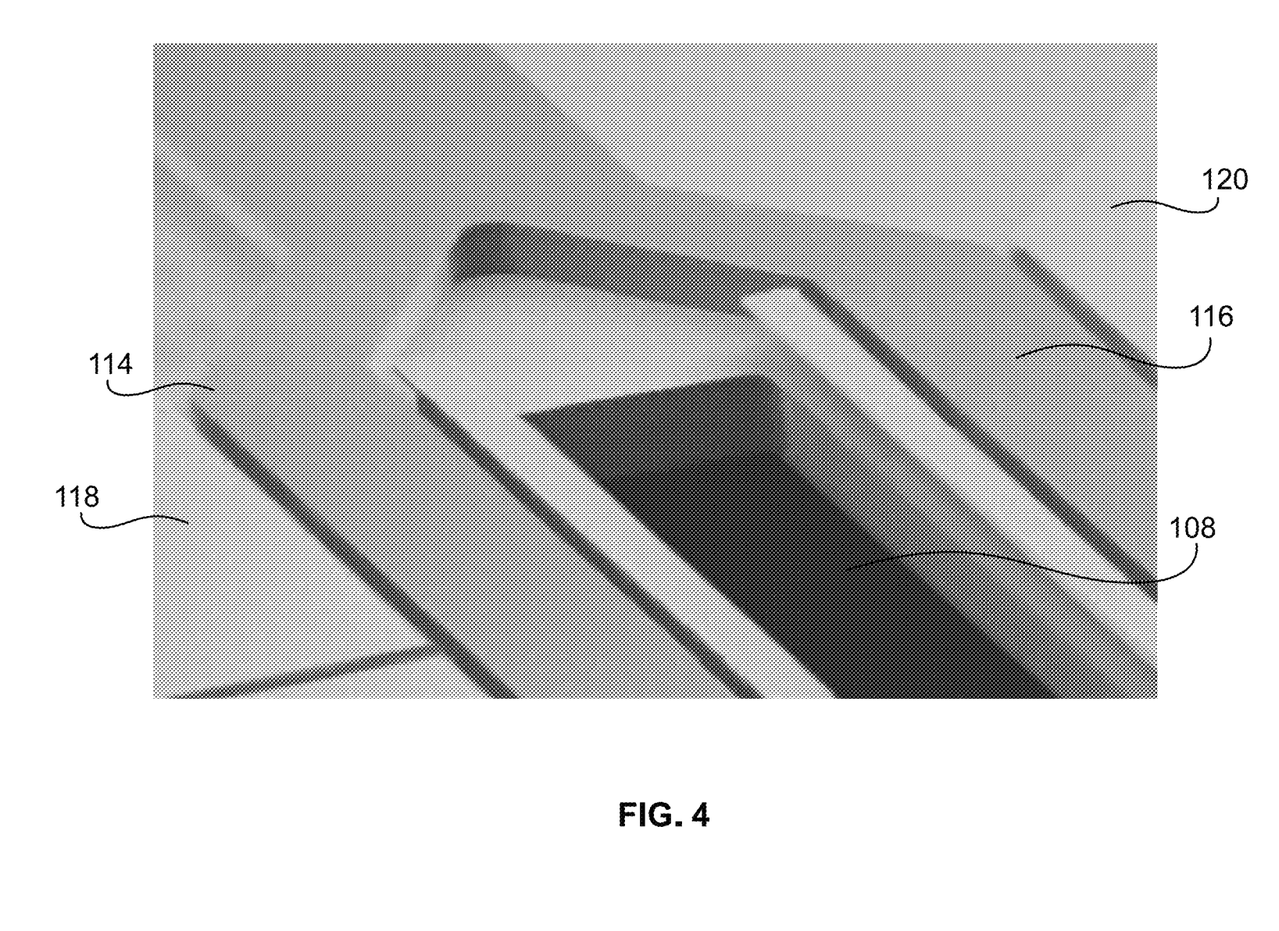
FIG. 4 is a detail of the prototype of FIG. 3, shown in perspective view. Visible features in the figure include portions of the loading hole, the two inner dc electrodes bracketing the loading hole, and the RF electrode.

FIG. 1 is a cross-sectional view of the ion trap, and FIG. 2 is an overhead view. FIG. 3 is an overhead view of a fabricated prototype, showing the loading hole and part of the electrode layout. FIG. 4 is a detail in perspective view, showing portions of the loading hole, the two inner dc electrodes bracketing the loading hole, and the RF electrode.

The device is fabricated on an SOI wafer 100 using known photolithographic techniques and other techniques of CMOS and MEMS processing. It includes two metal layers 102, 104 (M1 and M2) separated by an insulating layer 106 of silicon dioxide. Geometrically, the trap has a symmetric six-rail design with a 100-µm-wide slot 108 (the "loading hole") etched through the substrate to allow for backside ion loading and optical access.

Adjacent to the slot, as best seen in FIG. 3, are split central control electrodes 110, 112, two electrodes 114, 116 with RF voltages applied, and forty outer segmented control electrodes 118, 120. The control electrodes (also referred to as "dc electrodes") have quasistatic voltages applied to them.

As best seen in FIG. 1, the oxide layer 106, 14 µm thick, separates the top metal layer from the bottom metal layer. Each metal layer is aluminum, 2.4 µm thick.

Turning back to FIG. 3, the two RF rails 114, 116 are each 60 µm thick and are separated by 140 µm. The combined capacitance of the RF rails is about 7 pF to RF ground.

The equilibrium trapping position is about 80 µm above the trap surface.

Turning again to FIG. 1, the oxide insulating layer 106 is controllably etched back to expose the RF ground plane 102 in M1 directly beneath the electrodes, and to recess the oxide support walls for the electrodes in M2. Because of this recess 130, the electrode metal overhangs the oxide, thus reducing the amount of insulator exposed to a line-of-sight from the trapping region. One benefit of this overhang is that it enables a metal of choice to be evaporated onto the top electrodes without causing short circuits.

The electrical connections 132 between metallization layers, as seen in FIG. 1, are made by 2.7-µm via technology.

Optionally, the exposed silicon surfaces can be evaporatively coated with a ground layer, for example a 500-nm layer of gold.

The implementation shown in FIGS. 1 and 2 is readily modified by adding additional metallization layers, using conventional CMOS fabrication techniques. In particular, it may be advantageous for at least some applications to add a ground plane on a new M1 layer beneath the top metal layer (i.e., beneath the layer shown in FIGS. 1 and 2 as the M1 layer in the illustrated implementation).

Figure 5:
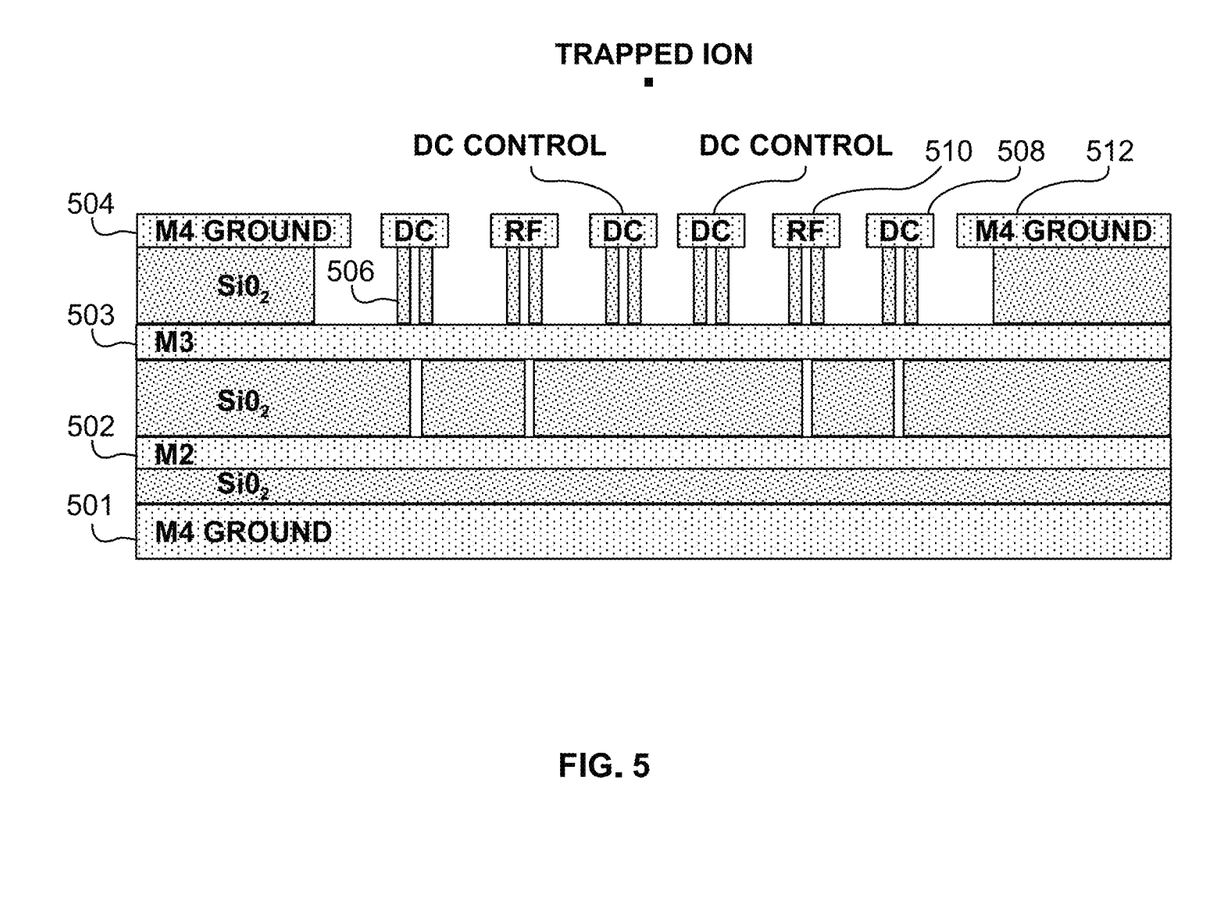
FIG. 5 is a notional cartoon view, in cross-section, of an example ion trap that uses four metallization layers. The figure is highly simplified, and its scale is grossly distorted for clarity of presentation.

For example, FIG. 5 provides a notional cross-sectional view of a more recent fabrication technology for ion traps that uses four metallization layers 501, 502, 503, 504, i.e., M1-M4. The respective layers are separated by oxide pillars. Connections are made among the layers with tungsten via interconnects. FIG. 5 is not drawn to scale, and various simplifications have been made for clarity of presentation.

The electrodes in the top metal (M4) overhang their supporting oxide walls 506, as described above. These overhangs are beneficial for, among other things, shielding the trapped ions from stray charges on the dielectric surfaces.

The DC and RF trap electrodes 508, 510 are fed by buried metal lines on M2. Microwave signals for controlling state transitions may be delivered by buried transmission lines on M3 and shielded by a surface ground plane 512 on M4.

Figure 6A:
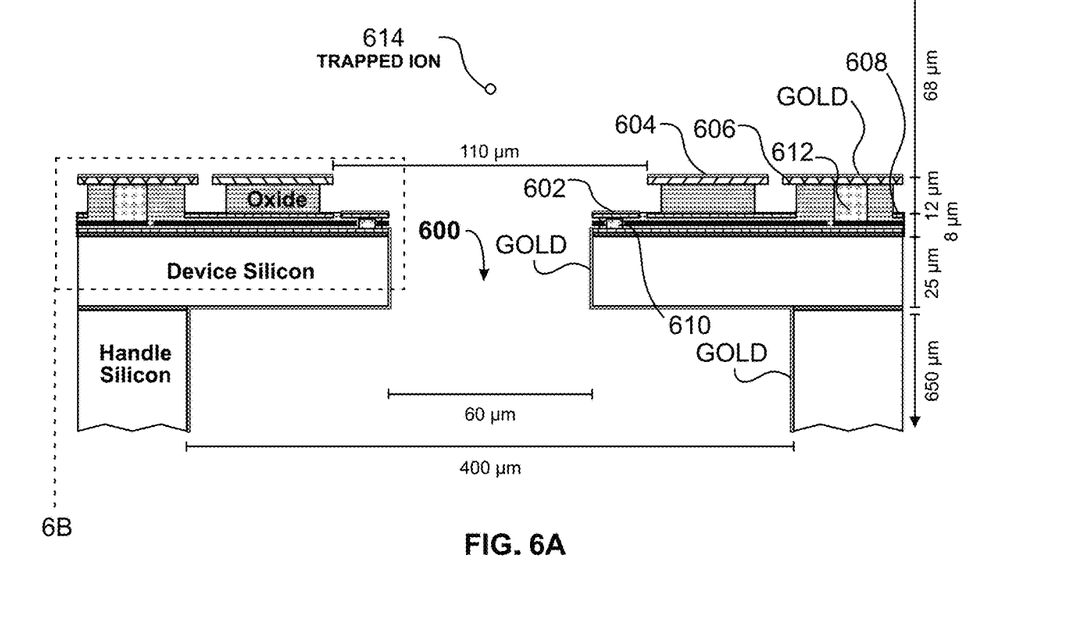
Figure 6B:
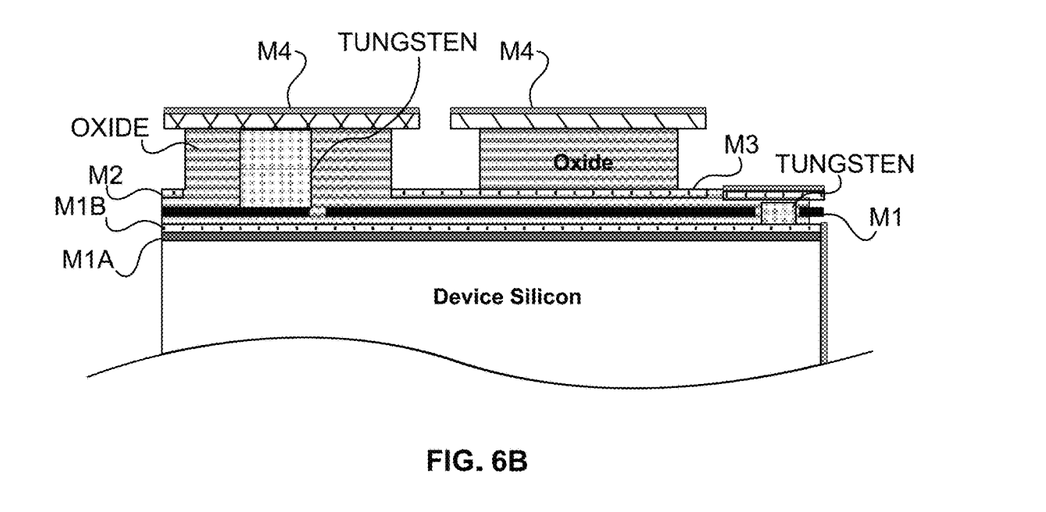
FIG. 6B is a detail of FIG. 6A.

FIGS. 6A and 6B provide a more realistic drawing, approximately to scale, of the slotted quantum region of an ion trap fabricated in four metallization layers. FIG. 6B is a detail of FIG. 6A. The metallization layer M1A is a diffusion barrier of titanium nitride. The other metallization layers (i.e., M1B, M2, M3, and M4) are composed of aluminum alloyed with 0.5% copper. The non-limiting example that is illustrated has a 60-µm-wide slot 600 in the quantum region. In sequence from the center of the slot, the electrodes shown in the drawing are: DC control electrodes 602 in M3, RF electrodes 604 in M4, DC control electrodes 606 in M4, and a ground plane 608 in M3. Each inner DC electrode 602 is seen to be connected by tungsten vias 610 to the M1 level, and each outer DC electrode 606 is seen to be connected by tungsten vias 612 to the M2 level. Typical thicknesses are indicated on the drawing, including the height of the trapped ion 614 above the M4 level. The metallization levels and the exposed dielectric surfaces are overcoated with gold.

A still more recent advance in fabrication technology for ion traps uses six metallization layers. The additional metal layers provide more routing space to connect electrodes, which may be densely distributed, to the bond pads situated near the edges of the trap chip. By adding more metal layers, we can also increase the dielectric thickness between the RF electrodes and the ground planes. This has the benefit of reducing the overall capacitance of the RF electrode without sacrificing chip area that might be needed for the lithographic definition of structural features such as silicon dioxide support pillars for the electrodes.

In a non-limiting example, electrodes are provided on the top metal (M6) layer, shielding is provided by ground planes on the next two layers (M5 and M4), signal routing is provided by traces on the next two layers (M3 and M2), and a ground plane is provided on the bottom layer (M1).

As explained above, a stable RF amplitude is an important condition for RF Paul traps to be useful in quantum information processing. Feedback stabilization is a useful approach for satisfying this condition. Feedback stabilization, however, requires a sensor that can supply a control signal indicative of the RF amplitude. Desirably, the sensor is thermally stable and adds no significant capacitance.

Figure 7:
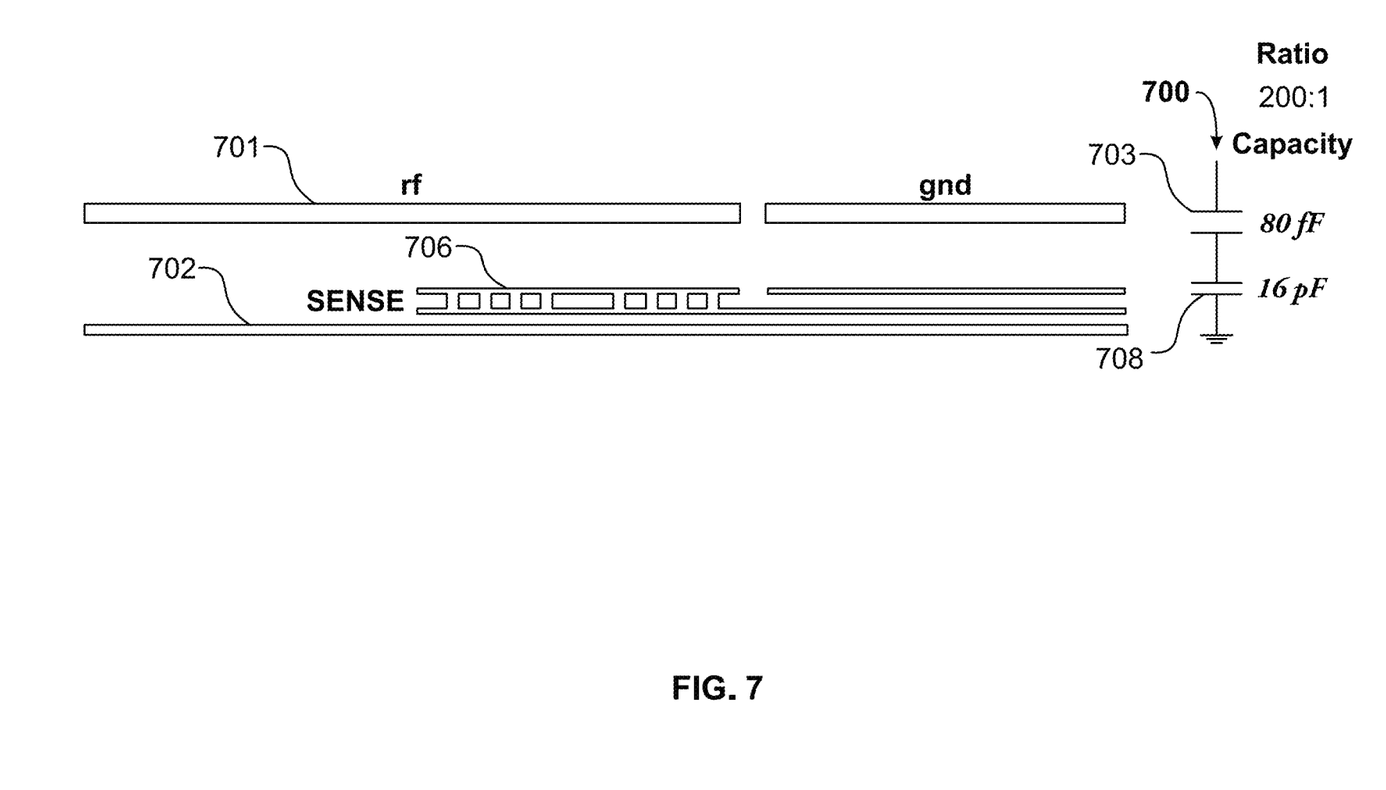
FIG. 7 is an elevational sectional view of an amplitude sensor according to the principles discussed here.
Figure 8:
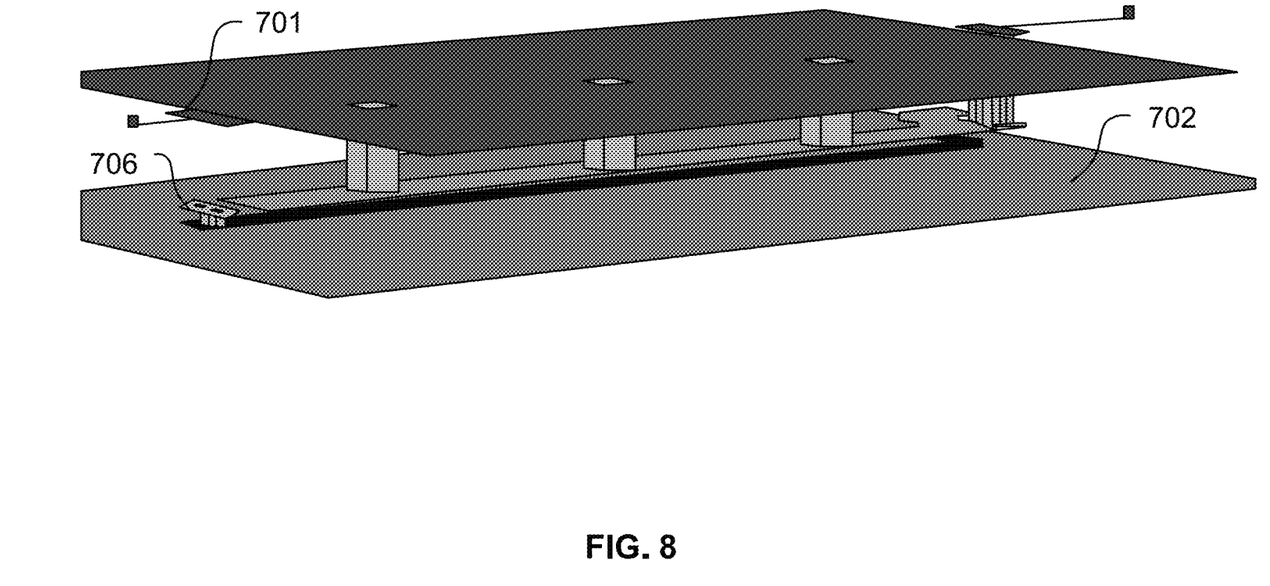
FIG. 8 is a cutaway perspective view of the sensor of FIG. 6.

FIG. 7 is an elevational sectional view, and FIG. 8 is a cutaway perspective view, of a new RF amplitude sensor that we have designed for a microfabricated surface electrode ion trap. The new sensor uses a capacitive voltage divider 700 between the RF electrode 701 and ground 702. This capacitive voltage divider is integrated into the ion trap.

The path from the RF electrode to ground includes a capacitance 703 between the RF electrode 701 and a sensor plate 706 (referred to here as the "upper" capacitance with reference to its position in the drawings), and a capacitance 708 between the sensor plate 706 and ground 702 (referred to here as the "lower" capacitance with reference to its position in the drawings). The upper capacitance is realized by two parallel metal plates separated by silicon dioxide interlayer dielectric. One of these plates is constituted by a portion of the RIF electrode 701 of the ion trap. The other plate is the sensor plate 706.

In the example of FIGS. 7 and 8, the RE electrode is fabricated in the top metal layer, i.e. the layer M4. The sensor plate is fabricated in the M3 and M2 metal layers. The upper capacitance, i.e. the capacitance between the RF electrode and the sensor plate, is the capacitance that obtains between M4 and M3, and the sensor signal is passed vertically through vias from M3 to M2 and extracted on a lead fabricated in M2. The upper capacitance is designed in the present, non-limiting, example to be about 80 fF. The vias between M3 and M2 can be fabricated, for example, by conventional CMOS back-end-of-line processing.

As noted, the signal from the sensor plate is routed out of the device on a trace on M2 that passes through a ground channel between ground planes. The pertinent ground planes in the example of FIGS. 7 and 8 are formed in M1 and M3. The lower capacitance is realized by the sensor routing trace and its surrounding ground planes.

The lower capacitance is determined by the width of the trace for sensor routing and by the separation between that trace and its surrounding ground planes. The chosen value for the lower capacitance in the present, non-limiting, example is about 16 pF. The combination of about 80 fF for the upper capacitance and about 16 pf for the lower capacitance yields a divider ratio of about 200:1. (It will be understood that the "upper" capacitance is the smaller of these two quantities.)

One notable feature of our sensor is that it exploits the capacitance from RE electrode to ground that is already present in the ion trap. Hence, there is no need to add to the capacitance that is already present.

Figure 9:
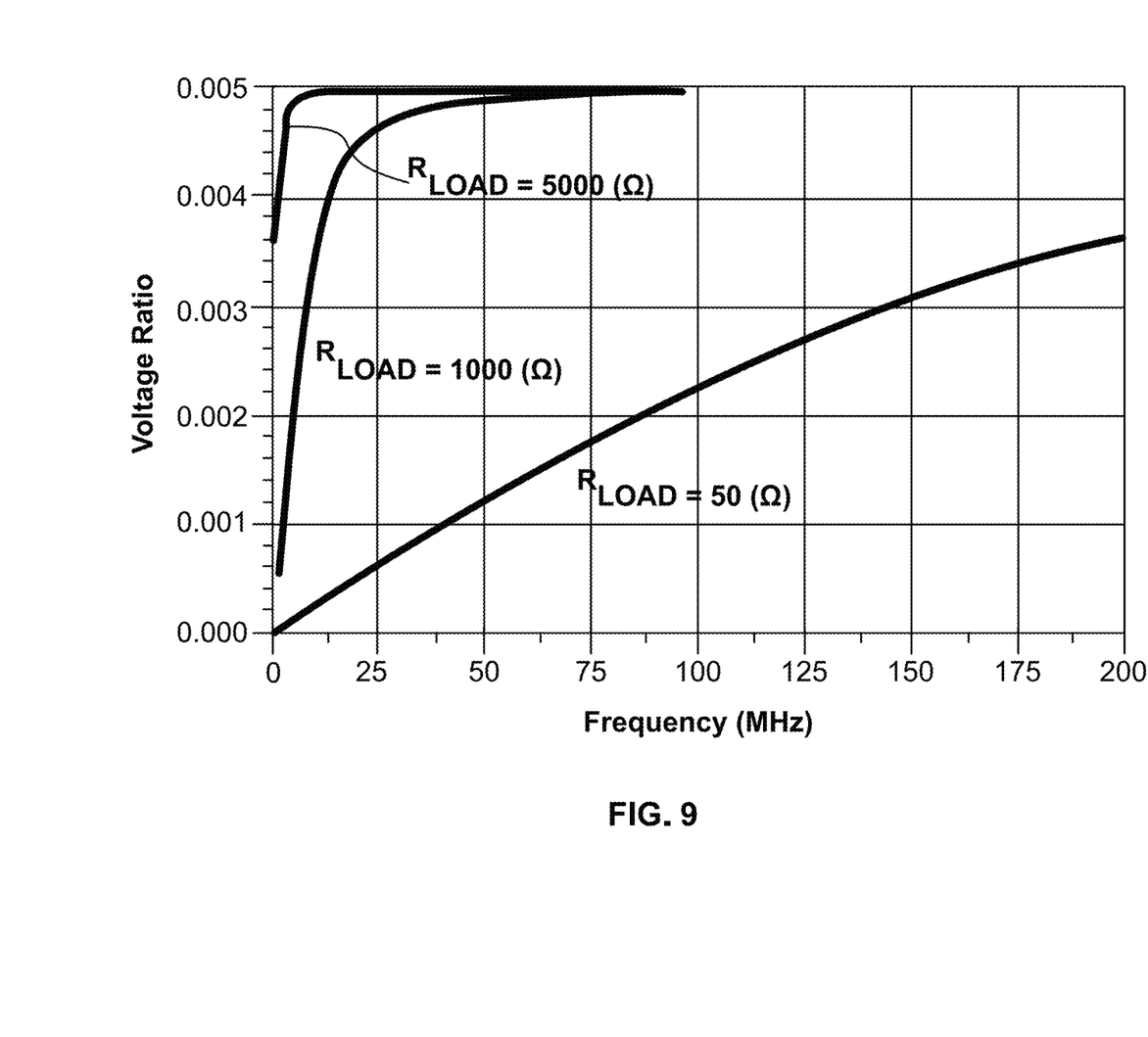
FIG. 9 is a graph of the output voltage from a sensor such as the sensor of FIGS. 6 and 7 as a function of frequency. The output voltage is expressed as a voltage ratio. Three plots are shown, each for a respective value of the load resistance that terminates the sensor output circuit.

For a given RF amplitude, the output voltage from the sensor will depend on frequency and on the load resistance $R_{LOAD}$ that terminates the sensor output circuit. FIG. 9 is a graph showing that dependence (expressed as a voltage ratio) for three example values of the load resistance, namely, 50 Ω, 1000Ω, and 5000Ω. The three plots in FIG. 8 were simulated from equivalent circuit models. A processor situated off chip can be used to make the conversions necessary for interpreting the sensor output signal.

As is desirable, our capacitive voltage divider can operate over the range from liquid helium cryogenic temperatures to room temperature. It is important in this regard that the upper capacitance and the lower capacitance will both scale the same way with temperature, so that the voltage at the sensor output will be temperature-independent.

As explained above, temperature stabilization is another important condition for RF Paul traps that are to be used in quantum information processing. Hence, a temperature sensor is another useful feature of an ion trap.

We have provided a temperature sensor in the form of a thin, meandering aluminum wire. In a nonlimiting example, the aluminum wire is 2 μm wide and 140 mm long and has a room-temperature resistance of about 1 kΩ. This resistance drops to about 70Ω, when the temperature is reduced to 4° K.

In an example configuration, the meandering aluminum wire follows a course along the perimeter of the ion trap die, folds back on itself, and follows a parallel course for several repetitions. For the purpose of thermal sensing, the precise placement of the sensor wire on the die is not believed to be critical.

The resistance of the meandering aluminum wire is an indicator of the temperature. Using the well-known four-probe technique, the resistance can be accurately measured over a temperature range from about 4° K to 500° K, which is the maximum operating temperature of our example device.

To reduce noise in the temperature-sensing circuit, capacitors are provided to provide a path to ground for RF drive voltage that might be picked up by the sensor wire. In example implementations, these capacitors are integrated directly on the chip.

A typical example of a suitable total capacitance value for this purpose is about 1 nF.

A heating wire can also be provided. In examples, the heating wire is a meandering aluminum wire having the same dimensions as the wire for the temperature sensor. The heating wire does not need to be capacitively, shunted. In fact, it is preferably isolated from any trench capacitors so that it can early voltages exceeding the capacitor breakdown voltages.

Figure 10:
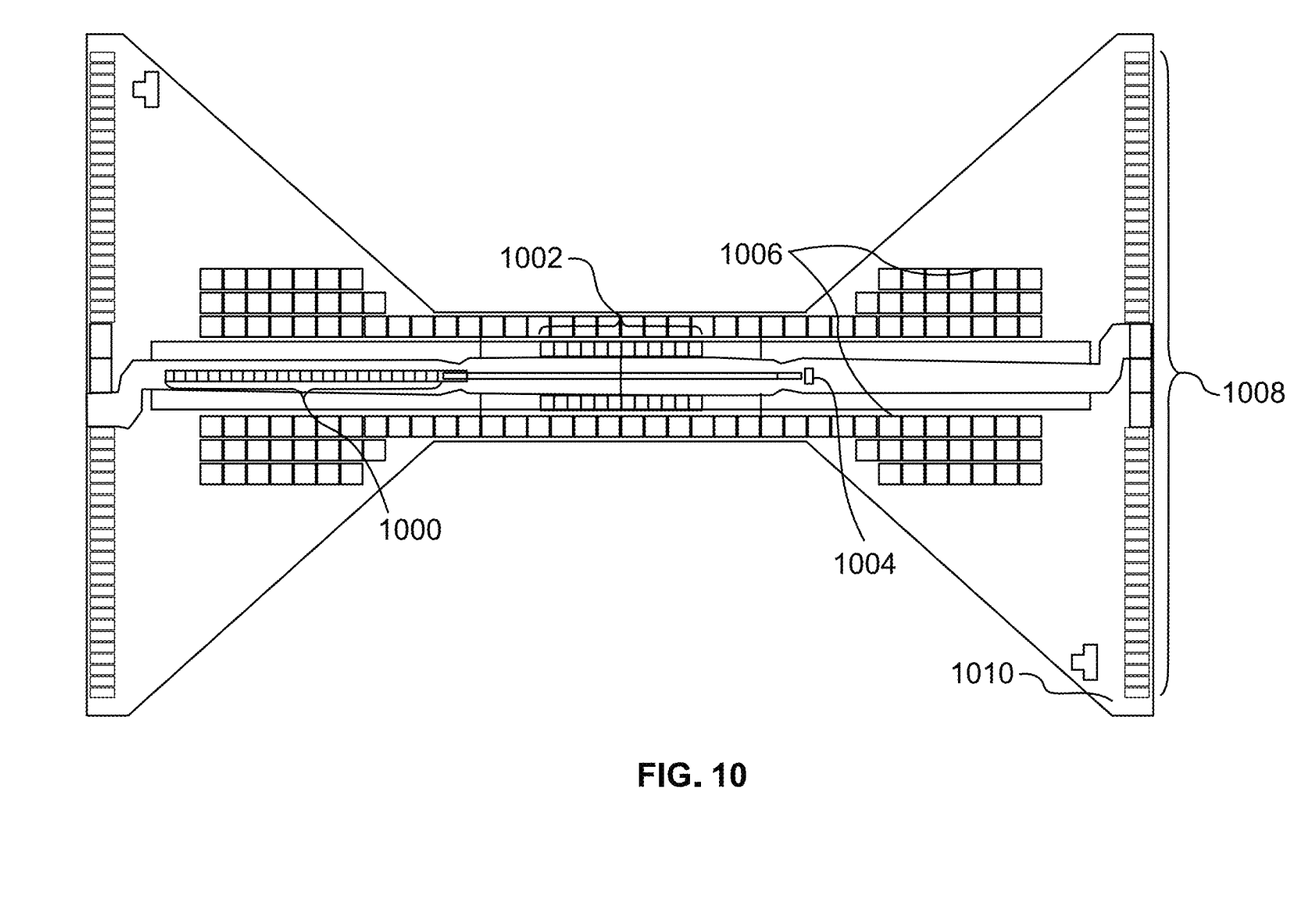
FIG. 10 is a plan view of a complete ion trap chip, in an illustrative example.

FIG. 10 is an illustrative example of a complete ion trap chip with a linear trap, shown in plan view. Features shown in the figure include the loading region 1000 and the quantum region 1002 of the chip, the RF amplitude sensor 1004 as described above, and a bank 1006 of onboard RF shunt capacitors, which are integrated directly on the chip. Wirebond blocks 1008 for input and output are also shown. Also indicated on the figure is a possible position 1010, near the periphery of the chip, for the temperature-sensing wire and for a resistive heating wire.

We claim:

1. Apparatus comprising an ion trap chip of the kind in which a radio-frequency (RF) surface ion trap including an RF electrode is disposed on a substrate having a plurality of metallization levels including a top metallization level N, N a positive integer, wherein:

the ion trap chip further comprises a capacitive voltage divider integrated on the ion trap chip;

the capacitive voltage divider includes a sensor plate, wherein the sensor plate is sandwiched between and parallel to at least a portion of the RF electrode and at least a portion of a ground plane electrode situated at a lower metallization level than the RF electrode and sensor plate, capacitively connected between the RF electrode and said ground plane electrode, and situated on at least a first metallization level lower than the top metallization level;

the ion trap chip further comprises a sensor output trace connected to the sensor plate, formed at least in part in a different metallization layer than the first metallization layer, and adapted for conveying an RF voltage signal from the sensor plate to a connection to off-chip sensing circuitry;

the sensor plate is coupled through a first capacitance to the RF electrode and through a second capacitance to the ground plane electrode; and the first capacitance is less than the second capacitance.

2. The apparatus of claim 1, wherein the RF electrode is formed in the top metallization layer.

3. The apparatus of claim 2, wherein the sensor plate is situated at least in part on a metallization layer N−1 that is next below the top metallization layer.

4. The apparatus of claim 3, wherein the sensor output trace is formed in a metallization layer N−2 that is next below the N−1 metallization layer.

5. The apparatus of claim 4, wherein the sensor output trace is connected by vertical electrical connections to a portion of the N−1 metallization layer.

6. The apparatus of claim 5, wherein the sensor output trace is shielded, at least in part, by a ground plane in the N−1 metallization layer next above it and by a ground plane in a metallization layer N−3 next below it.

7. The apparatus of claim 1, wherein the capacitive voltage divider has a divider ratio of about 200:1.

8. The apparatus of claim 1, further comprising an off-chip signal processor connected to the sensor output trace for receiving signals indicative of RF amplitude.

9. The apparatus of claim 8, wherein the off-chip signal processor is connected to an RF source for controlling the RF source, and wherein the RF source has an RF output connected to the RF electrode.

10. The apparatus of claim 1, further comprising a temperature-sensing metal wire affixed to, and in thermal contact with, the substrate.

11. The apparatus of claim 10, further comprising one or more capacitors that are integrated on the substrate and connected to the temperature-sensing metal wire as RF shunts from the said wire to ground.

12. Apparatus comprising an ion trap chip of the kind in which a radio-frequency (RF) surface ion trap including an RF electrode is disposed on a substrate having a plurality of metallization levels including a top metallization level N, N a positive integer, wherein:

the ion trap chip further comprises a capacitive voltage divider integrated on the ion trap chip; and the capacitive voltage divider includes an intermediate voltage node capacitively connected between the RF electrode and a ground on a metallization level lower than the top metallization level;

and wherein the ion trap chip further comprises:

a sensor output trace connected to the intermediate voltage node;

a temperature-sensing metal wire affixed to, and in thermal contact with, the substrate;

one or more capacitors that are integrated on the substrate and connected to the temperature-sensing metal wire as RF shunts from the said wire to ground; and a four-probe resistance sensor connected to the temperature-sensing metal wire for sensing its electrical resistance.

13. The apparatus of claim 12, further comprising an off-chip signal processor connected to the four-probe resistance sensor so as to receive from it a signal indicating the electrical resistance of the temperature-sensing metal wire.

14. The apparatus of claim 13, further comprising a heating wire and a heating current source, wherein the heating source is connected so as to be controlled by the signal processor and so as to drive a controllable heating current through the heating wire.

* * * * *